United States Patent [19]

Takeuchi et al.

[11] 4,028,022

[45] June 7, 1977

[54] OIL SEAL ASSEMBLY

[75] Inventors: Hiroshi Takeuchi, Tokyo; Toshitugu Ishizawa, Higashi-Murayama; Tetuyuki Yamano, Kodaira; Ko Chiba; Daisaku Kobayashi, both of Kashiwazaki, all of Japan

[73] Assignees: Nissan Motor Co., Ltd., Yokohama; Riken Piston Ring Kogyo Kabushiki Kaisha, Tokyo, both of Japan

[22] Filed: May 16, 1975

[21] Appl. No.: 578,128

Related U.S. Application Data

[62] Division of Ser. No. 398,784, Sept. 19, 1973, abandoned.

[30] Foreign Application Priority Data

Sept. 20, 1972 Japan .......................... 47-109358

[52] U.S. Cl. .......................................... 418/104

[51] Int. Cl.² .......................................... F01C 19/12

[58] Field of Search .................... 418/104, 142–144

[56] References Cited

UNITED STATES PATENTS

| | | | |
|---|---|---|---|
| 3,256,831 | 6/1966 | Eickmann | 418/144 |
| 3,323,712 | 6/1967 | Froede et al. | 418/142 |
| 3,415,444 | 12/1968 | Frenzel et al. | 418/104 |
| 3,575,541 | 4/1971 | Hamada | 418/142 |
| 3,706,514 | 12/1972 | Ruf | 418/104 |
| 3,781,147 | 12/1973 | Sato | 418/104 |
| 3,909,015 | 9/1975 | Kasahara | 418/142 |

FOREIGN PATENTS OR APPLICATIONS

| | | | |
|---|---|---|---|
| 1,299,645 | 7/1969 | Germany | 418/104 |

*Primary Examiner*—John J. Vrablik

[57] ABSTRACT

A rotary piston internal combustion engine has a rotor journalled on an eccentric portion of an engine shaft. A sealing arrangement comprises a first radially extending annular face connected to the engine shaft, a disc connected to the rotor and having a second radially extending annular face, and a sealing ring disposed between the first and second faces. A spring biases the sealing ring to maintain sealing contact of the sealing ring with one of the first and second faces. An O-ring is disposed between the sealing ring and that one of the rotor and engine shaft which is in rotatable unison with the other one of the first and second faces.

7 Claims, 6 Drawing Figures

24b
10b
38b
48b
72b
74b
76
44b
32b
40b
64b
68b
66b
54b
46b
52b
50b
42b
62b 24
26
14
10
12
36
37
40
32
40
42
22
18
40
37
37
28
30
16

36
48
10
58
37
52
40
60
66
44
62
64
68
46
54
38
50
42
56

36a
24a
48a
10a
52a
37a
64a
38a
44a
40a
68a
54a
74
46a
32a
42a
72
70

OIL SEAL ASSEMBLY

This is a division, of application Ser. No. 398,784 now abandoned, Filed Sept. 19, 1973.

The present invention relates to a rotary piston internal combustion engine, and more particularly to an oil seal assembly for sealing between an eccentric portion of an engine shaft and a rotor of a rotary piston internal combustion engine.

Rotary piston internal combustion engines are known in the art and include, among other configurations, the Wankel type engine which utilizes a three lobed rotor disposed in a housing. The rotor has a hollow center or cavity through which lubricating oil passes. Working chambers are defined between the periphery of the rotor and the inner surface of the housing. It is therefore necessary to prevent flow of lubricating oil from the center of the rotor outward into a working chamber. In order to restrict the flow of oil, it has been known to provide a ring groove in the side of the rotor radially outward from its bearing and a seal groove around the eccentric portion of the engine shaft radially inward from the bearing. The ring groove and the seal groove receive an oil seal and a pair of sealing rings of piston ring types, respectively. The oil seal is urged axially outward to sealingly engage with the adjacent side surface of the housing. The sealing rings will contact to the inner surface of a center opening in the rotor by virtue of the fact that they are in substantial tension when they are positioned in the grooves. In order to provide a better sealing effect, the sealing rings are exposed to blow-by gas. The sealing rings are urged axially inward to engage with the inner radial wall of the seal groove by the pressure of the blow-by gas. The problem with the latter type of seal assembly is that the sealing rings are out of sealing engagement with the inner radial wall of the seal groove when the pressure of the blow-by gas is low, and lubricating oil will leak past the sealing rings through the inner radial wall of the seal groove. Tests of a Wankel type rotary engine with the above mentioned type seal assembly showed that the sealing rings are out of sealing engagement with the inner radial wall of the seal groove when the blow-by gas pressure is below atmospheric during engine braking, and under this condition oil consumption exceeds an acceptable limit.

The present invention aims at solving the above mentioned problem of sealing between a rotor and an eccentric portion of an engine shaft of a rotary internal combustion engine.

It is an object of the present invention to provide an oil seal assembly to seal between a rotor and an eccentric portion of an eccentric shaft of a rotary internal combustion engine which can replace an above described oil seal assembly including a type including conventional sealing rings.

It is a further object of the present invention to provide an oil seal assembly which provides effective sealing irrespective of the operating conditions of a rotary piston internal combustion engine.

It is still a further object of the present invention to provide an oil seal assembly which provides effective sealing performance over the expected life span of a rotary piston internal combustion engine.

These and other objects, features and advantages of the present invention will become apparent from the following description taken in conjunction with the accompanying drawings, wherein.

Figure 1:
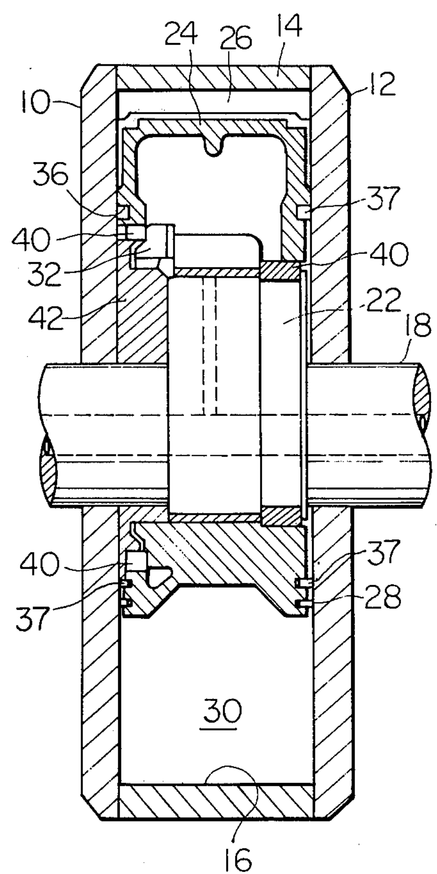
FIG. 1 is a longitudinal sectional view of a rotary internal combustion engine incorporating an embodiment of an oil seal assembly of the invention for sealing between a relatively rotatable eccentric portion of an engine shaft and a rotor rotatably supported on the eccentric portion.
Figure 2:
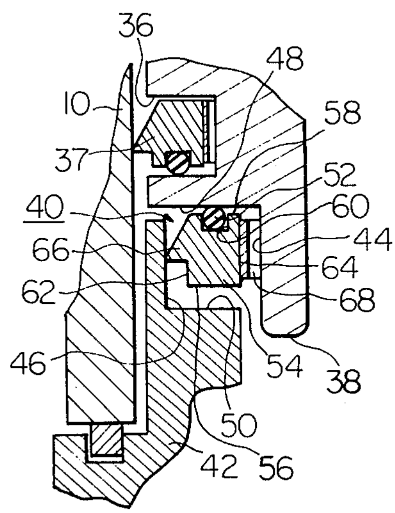
FIG. 2 is an enlarged partial sectional view of a left portion of the engine of FIG. 1 and provides a detailed cross-sectional view of the oil seal assembly.
Figure 5:
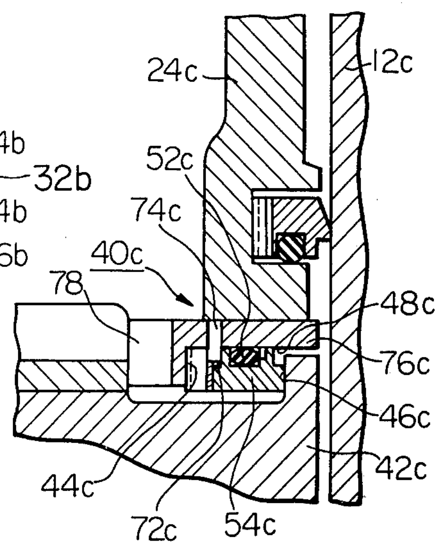
Figure 6:
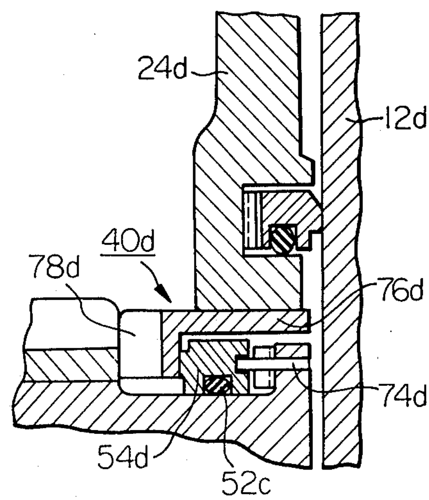

FIG. 5 is an enlarged sectional view of a right portion of the engine of FIG. 1 and provides a detailed cross-sectional view of a fourth embodiment of an oil seal assembly; and FIG. 6 is an enlarged sectional view, similar to FIG. 5, and shows a fifth embodiment of an oil seal assembly, As shown in FIGS. 1 and 2, a rotary internal combustion engine comprises a housing having axially spaced end walls 10 and 12, both having substantially flat inner surfaces, and a peripheral wall 14 disposed between the end walls 10 and 12 to form a cavity therebetween. An inner surface 16 of the peripheral wall 14 has a multilobed profile which is basically an epitrochoid. A shaft 18 extends coaxially within the cavity defined by the housing and is journalled in bearings (not shown) in the walls 10 and 12. Eccentrically disposed within the housing and journalled on an eccentric portion 22 of the shaft 18 is a multi-lobed rotor 24 having a plurality of circumferentially spaced apex portions around its outer periphery. Each of the apex portions has a radially movable apex seal 26 which is in continuous sealing engagement with the inner surface 16. The axial faces of the rotor 24 are substantially flat and have side seals 28 extending between adjacent pairs of apex seals 26 which sealingly engage with the end walls 10 and 12. The rotor 24 and the housing define therebetween a plurality of working chambers 30 which vary in volume when the rotor 24 rotates within and relative to the housing. During rotation of the rotor 24 and variation of the volume of the working chambers 30, intake, compression, power and exhaust strokes are performed. Intake of combustible gas and exhaustion of products of combustion are carried out by means of conventional intake and exhaust ports (not shown). Coaxially secured to the rotor 24 is an internal gear 32, which meshes with an external gear (not shown) coaxial with the shaft 18 and secured to the end wall 10 for producing proper relative motion of the rotor 24 within the housing.

The rotor 24 includes an oil ring groove 36 formed in each side face thereof. The grooves 36 are concentric with the rotor 24 and are spaced radially outward from a rotor bore 38. The bore 38 of the rotor 24 is supplied with lubricanting oil. In order to eliminate flow of lubricanting oil from the bore 38 into the working chambers 30, a conventional oil ring seal 37 is employed in the groove 36.

Referring now particularly to FIG. 2, a reference numeral 40 designates an embodiment of an oil seal assembly according to the present invention. The oil seal assembly 40 is utilized to seal between an oil seal disc 42 mounted on the left hand portion of the engine shaft 18 and the rotor 24, which members are eccentrically rotatable relative to each other.

The rotor 24 and the oil seal disc 42 have axially spaced and adjacent end faces 44 and 46, respectively.

The rotor 24 has an inner circumferential face 48 extending axially from the end face 44, which is radically outwardly spaced from an outer peripheral surface 50 of the oil seal disc 42.

The oil seal assembly 40 includes an O-ring 52 and a sealing ring 54. The O-ring 52 is preferably made of an elastomeric material such as rubber. The O-ring 52 is generally annular and is disposed radially inward of the circumferential face 48 of the rotor 24. The sealing ring 54 is formed from a nonelastomeric material such as cast iron. The sealing ring 54 is disposed between the end faces 44 and 46 and is disposed radially outward from the surface 50 of the oil seal disc 42.

The sealing ring 54 is generally annular and rectangular in cross-section and has a radially inner surface 56 which is radially spaced outward from the outer peripheral surface 50. The ring 54 has a radially outer surface 58 having formed therein an 0-ring groove 60 within which the O-ring 52 is disposed. A clearance is provided between the surface 58 and the face 48, but the ring 54 and O-ring 52 are dimensioned such that the O-ring 52 is tightly and sealing pressed against the face 48. The ring 54 has an axially outer surface 62 and an opposite or axially inner surface 64. The surface 62 has formed thereon a sealing edge 66 to sealingly engage with the end face 46.

The sealing edge 66 is maintained in sealing engagement with the end face 46 by a spring 68 of wave-like form is disposed between the inner surface 64 of the sealing ring 54 and the end face 44 of the rotor 24. The spring 68 is made of a material such as spring steel, and when it is in the position illustrated in FIG. 2, it will bias the sealing ring 54 axially away from the end face 44.

As has been illustrated, the force acting on the sealing ring 54 to produce sealing engagement thereof with the end face 46 is independent of operation of the engine, so that the force of the sealing edge 66 against the end wall 46 can be made optimum over all varying engine operating conditions.

Lubricating and cooling oil flowing axially outward along the outer peripheral surface 50 of the oil seal disc 42 is prevented from further flowing outward past the end face 46 by the sealing edge 66, and axial leakage along the circumferential face 48 is blocked by the O-ring 52 which sealingly engages with the circumferential face 48.

Figure 3:
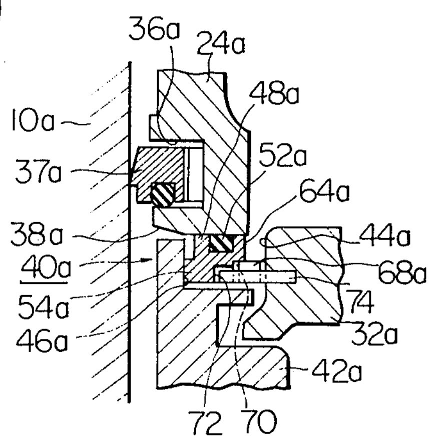
FIGS. 3 and 4 are enlarged sectional views, similar to FIG. 2, which show second and third embodiments of an oil seal assembly.

FIG. 3 shows a second embodiment of the present invention in which corresponding parts are designated by corresponding reference numerals followed by a character *a*. FIG. 3 shows an oil seal assembly 40*a* to seal between an oil seal disc 42*a* and a rotor 24*a* having an oil ring groove 36*a* and a conventional oil ring seal 37*a*. An internal gear 32*a* is also shown in FIG. 3.

A sealing ring 54*a* and an O-ring 52*a* are substantially identical to the sealing ring 54 and O-ring 52, respectively.

The primary structural difference between the embodiments of FIGS. 2 and 3 is that the latter employs means for preventing relative rotational movement between the rotor 24*a* and the sealing ring 54*a* in order to reduce frictional wear of the O-ring 52*a* due to relative rotational movement between the mating surfaces of the O-ring 52*a* and a circumferential face 48*a*. Another structural difference is that an end face 44*a* is provided on the internal gear 32*a*. Another difference is that the sealing ring 54*a* has formed in an inner surface 64*a* a notch 70 for receiving a spring 68*a* and a recess 72 extending axially into the sealing ring 54*a* from the bottom of the notch 70.

The means for preventing relative rotational movement between the rotor 24*a* and the sealing ring 54*a* includes a pin 74 extending through a clearance between the inner surface 64*a* and the end face 44*a*. The pin 74 has one end extending into the hole 72 and the other end extending into a hole in the internal gear 32*a*. The depth of the hole 72 should be determined relative to the length of the pin 74 in such a manner that the sealing ring 54*a* is movable axially but not rotationally relative to rotor 24*a*.

An advantage of the embodiment of FIG. 3 is that the O-ring 52*a* will not be subjected to frictional wear nor heat thereby prolonging the life of the oil seal assembly 40*a*.

Figure 4:
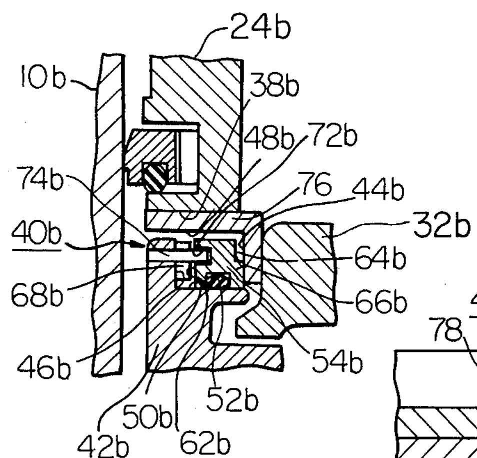

FIG. 4 shows a third embodiment of the present invention in which corresponding parts are designated by corresponding reference numerals followed by a character *b*. An oil seal assembly 40*b* of the invention shown in FIG. 4 is different from the embodiment of FIG. 3 in that a disc 76 is used to provide an inner circumferential face 48*b* and an end face 44*b*. Another difference between the embodiments of FIGS. 3 and 4 is that the latter employs an O-ring 52*b* which engages with an outer peripheral surface 50*b* of an oil seal disc 42*b*, and a sealing ring 54*b* which has an O-ring groove on its inner periphery and a sealing edge 66*b* on its radially inner surface 64*b* to sealingly engage with the end face 44*b*. The sealing ring 54*b* is urged axially away from an end face 46*b* by a spring 68*b* and is prevented from moving rotatably with respect to the oil seal disc 42*b* by a pin 74*b*.

The disc 76 is generally cylindrical and L-shaped in cross-section. The disc 76 is attached to a bore 38*b* in a fluid tight manner such as by liquid packing or an adhesive material.

The pin 74*b* is identical to the pin 74*a* and extends through the spring 68*b* in the same manner. The pin 74*b* has one end extending into a hole 72*b* extending into the sealing ring 54*b* from the outer surface 62*b* thereof and has the other end extending into the end face 46*b* of the oil seal disc 42*b*.

Since the sealing edge 66*b* of the sealing ring 54*b* is in dynamic sealing contact with the end face 44*b* of the disc 76 and is prevented from moving rotationally with respect to the oil seal disc 42*b*, it will be seen that the advantage achieved in the embodiment of FIG. 4 is equivalent to that of the embodiment illustrated in FIG. 3.

Because seals are provided at both sides of the rotary internal combustion engine rotor, the oil seal assemblies illustrated in FIG. 3 or 4 would require some modifications for use at the right side of the rotor as shown in FIG. 1. In the following, two embodiments of such modifications will be discussed.

As embodied in FIG. 5, a modification of the oil seal assembly illustrated in FIG. 3 can be used as a seal at the right side of the rotary internal combustion engine of FIG. 1. FIG. 5 shows a fourth embodiment of the present invention in which corresponding parts are designated by corresponding reference numerals followed by a character *c*. An oil seal assembly 40*c* of the invention shown in FIG. 5 is identical to the embodiment of FIG. 3 except that a disc 76*c* is employed to provide an end face 44*c* and a circumferential face 48*c* and a pin 74*c* extends radially into a sealing ring 54*c* and from the disc 76c through the circumferential wall 48c.

The disc 76c is attached to a rotor 24c in the same fluid tight manner as was described in the embodiment of FIG. 4. The disc 76c is generally cylindrical and is provided with a plurality of passageways, only one of which is shown and designated as 78. Lubricating oil after having lubricated and cooled the rotor 24c will discharge from the inside of the rotor 24c into an oil sump (not shown) through these passageways 78.

The sealing ring 54c is identical to the sealing ring 54a employed in the oil seal assembly 40a illustrated in FIG. 3 except that the former employes a radial hole 72c extending radially inward into the sealing ring 54c from the outer periphery thereof. The hole 72c may be in the form of a groove and a spring (not shown) provided to bias the sealing ring 54c against an end face 46c, such that axial but not rotational motion is allowed between the sealing ring 54c and the rotor 24c.

As embodied in FIG. 6, a modification of the oil seal assembly illustrated in FIG. 4 can be used as a seal at the right side of the rotary internal combustion engine of FIG. 1 similar to the embodiment of FIG. 5. FIG. 6 shows a fifth embodiment of the present invention in which corresponding parts are designated by corresponding reference numerals followed by a character *d*. An oil seal assembly 40d of the invention is generally identical to the embodiment of FIG. 4 except that a disc 76d is provided with a plurality of passageways 78d.

What is claimed is:

1. In a rotary piston internal combustion engine having a rotor journalled on an eccentric portion of an engine shaft, an oil sealing arrangement comprising:
- a first disc connected to the engine shaft and having a first radially extending annular face which is in rotatable unison with the engine shaft;
- a second disc connected to the rotor and having a second radially extending annular face which is in rotatable unison with the rotor, said second face being spaced from and facing with said first face;
- a sealing ring disposed between said first and second faces, said sealing ring having a surface adapted to engage with the adjacent one of said first and second faces;
- a spring disposed between the other one of said first and second faces and said sealing ring to be compressed therebetween to bias said sealing ring away from said other face to sealingly engage said surface of said sealing ring with said one face; one
- an O-ring sealing disposed between said sealing ring and that one of said first and second discs which has said other face and.

2. An oil sealing arrangement as claimed in claim 1, further in combination therewith, of means for preventing relative rotational movement between said sealing ring and said other face, but for allowing relative axial movement between said sealing ring and said other face.

3. An oil sealing arrangement as claimed in claim 1, further in combination therewith, of a pin constructed and arranged such that relative rotational movement between said sealing ring and said other face is prevented, but relative axial movement between said sealing ring and said other face is allowed.

4. An oil sealing arrangement as claimed in claim 3, in which said pin has one end fixed to said other face and other end extending axially into said sealing ring.

5. An oil sealing arrangement as claimed in claim 3, in which said second disc having said other face sealingly engages said 0-ring on an outer peripheral surface thereof.

6. An oil sealing arrangement as claimed in claim 5, in which said pin connects said sealing ring to said second disc.

7. An oil sealing arrangement as claimed in claim 6, in which said second disc is provided with a plurality of lubricant passageways.

* * * * *